Patented Sept. 1, 1942

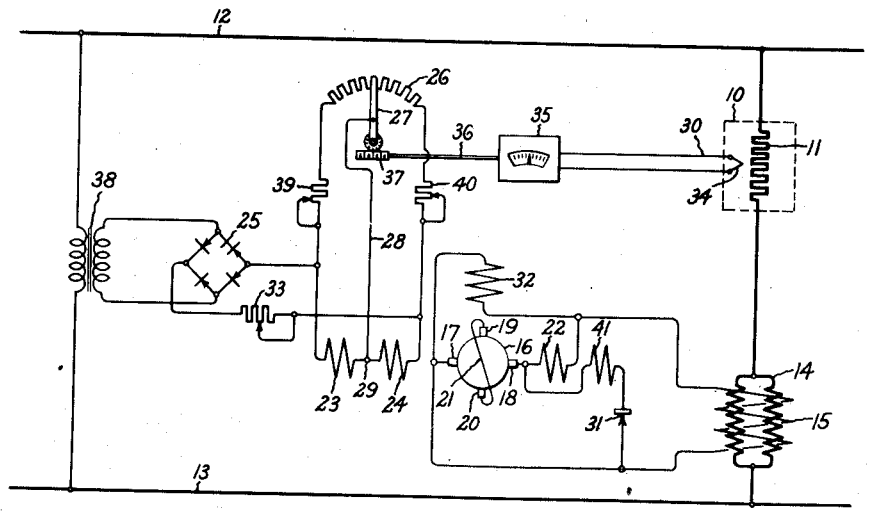
Inventors:
Martin A. Edwards,
Kenneth K. Bowman,
by Harry E. Dunham
Their Attorney.

2,294,775

UNITED STATES PATENT OFFICE 2,294,775

CONTROL SYSTEM

Martin A. Edwards and Kenneth K. Bowman, Scotia, N. Y., assignors to General Electric Company, a corporation of New York Application November 1, 1940, Serial No. 363,900

4 Claims. (Cl. 171—242)

This invention relates to control systems, more particularly systems used in the control of electrically heated devices such as furnaces, ovens and the like, and has for its object a simple, reliable system giving accurate regulation of the temperature to be maintained.

In carrying out our invention in one form, we utilize a variable impedance device such as a saturable core reactor for controlling the current input to the electric heat generating apparatus, together with an electric generator of the armature reaction type whose voltage responds very quickly and with very high amplification to any change in its field excitation. The field excitation of this generator is controlled by temperature responsive means. We also provide electric valve means connected across the generator for disabling the generator in the event that its polarity is reversed, as might occur with excessively high temperatures.

For more complete understanding of our invention, reference should be made to the accompanying drawing, the single figure of which shows in diagrammatic form an electric furnace control system embodying our invention.

Referring to the drawing, we have shown our invention in one form as applied to an electric furnace 10 provided with a heating resistor 11, which is supplied with energy from suitable alternating current supply at mains 12 and 13. Obviously, however, the furnace 10 may be any suitable heated device, both electric and non-electric, for the control of whose temperature our control system may be used.

For the control of the current through the resistor 11, we provide a variable impedance device shown as a saturable core reactor 14 connected in series with the resistor 11 across the supply mains. In order to control the impedance of the reactor 14 and thereby control the current through the resistor, the core of the reactor 14 can be saturated by means of a winding 15. For the purpose of preventing transformer action between the reactor winding and the coil 15, two parallel connected oppositely wound reactor windings mounted on separate core legs are used with the coil 15 surrounding the two windings.

Direct current is supplied to the winding 15 from a generator 16 of the type described and claimed in the copending application of Ernst F. W. Alexanderson and Martin A. Edwards, Serial No. 281,008, filed June 24, 1939, and assigned to the same assignee as this invention, now Patent No. 2,227,992.

This generator 16 has a pair or set of current supply brushes or terminals 17 and 18 which are connected to the coil 15 and a second pair of brushes 19 and 20 which are permanently short-circuited through a conductor 21 and which are in quadrature relation with the current supply brushes 17 and 18. Also, the generator 16 is provided with a series compensating winding 22 which substantially neutralizes the armature reaction of the generator along the current supply brushes 17 and 18. The generator is also provided with a separately excited field winding consisting of two reversely wound coils or windings 23 and 24. These coils 23 and 24 have the same number of turns, and they are energized in series with each other from a two-way rectifier 25. The two coils are connected together in magnetic opposition to each other so that the net separate excitation for the generator 16 is the difference between the fields set up by the two windings and in the direction of the field of that winding having the greater excitation.

Since the brushes 19 and 20 are short-circuited, a very small amount of flux is required to induce enough voltage to build up a relatively large primary current through that part of the armature winding which is connected between these brushes. This primary current produces a magnetic flux, and as the armature rotates, the conductors connected to the secondary brushes 17 and 18 cut this primary magnetic flux and a voltage is induced between the brushes 17 and 18. Current flowing through these brushes and to an external load produces a secondary armature reaction along the axis of these brushes.

The exciting windings 23 and 24 provide a magnetic excitation along the secondary axis of the brushes 17 and 18 and in opposition to the secondary armature reaction. This excitation induces an electromotive force in the armature winding between the primary brushes 19 and 20. The sensitivity of the control by variation of the field produced by the windings 23 and 24 is increased by reducing the secondary armature reaction flux, which is effected by the field winding 22 arranged to provide a component of magnetic excitation along the secondary commutating axis of the machine in opposition to the secondary armature reaction. This winding 22 substantially neutralizes the armature reaction flux along the secondary axis under all load conditions. It supplies excitation in the same direction as the field windings 23 and 24, its excitation, however, being proportional to the load current. With this arrangement, the controlling field windings 23 and 24 are required to supply only a relatively small excitation and consequently such field windings, having low resistance and inductance, are provided with resultant quick response to changes in current in these field windings. Therefore, a relatively small amount of energy is required to control the field windings 23 and 24 and the machine inherently has a high rate of response.

The excitation of the windings 23 and 24 is controlled by means of a resistance 26 connected across the two windings in parallel relation with them to the rectifier 25. The resistance 26 is provided with a contact arm 27 electrically connected through a conductor 28 to a midpoint 29 between the two coils 23 and 24 and movable in response to the temperature of the furnace 10 under the control of a temperature responsive device 30.

Thus, when the contact arm 27 is in a mid position on the resistance 26, the currents in the two coils 23 and 24 are equal to each other and therefore the coils neutralize each other, providing no field excitation. When the contact arm 27 is moved from the central position, it decreases the excitation of one of the coils and at the same time increases the excitation of the other coil. Thus, movement of the contact arm toward the left hand end of the resistor 26, as seen in the drawing, decreases the excitation of the coil 23 and increases the excitation of the coil 24. By reason of this action, the separate field excitation is very quickly responsive to movement of the contact arm.

Assuming that the temperature of the furnace 10 is below a desired predetermined temperature to be maintained and that by reason of this low temperature the device 30 has moved the contact arm 27 toward the left hand end of the resistance, the excitation of the coil 24 predominates and the generator 16 supplies a voltage to the control winding 15 of the reactor with resulting flow of current and saturation of the core of the reactor to a predetermined degree depending upon the temperature of the furnace with relation to the predetermined desired temperature. This partial or complete saturation of the reactor, as the case may be, provides for an increase in the current through the resistor 11 as compared with the condition of no saturation of the reactor whereby the resistor generates heat at a rate which is high enough to increase the temperature of the furnace. As the temperature increases, the device 30 moves the contact arm 27 toward the right to decrease the excitation of the coil 24 and at the same time increase the excitation of the coil 23. This action reduces the net separate field excitation, whereby the current through the saturating winding 15 is decreased and the current supplied to the resistor 11 is decreased. Eventually, when the furnace reaches the predetermined temperature to be maintained and for which the control apparatus is adjusted, the contact arm 27 will have been moved from an extreme left hand position to a position near the middle of the resistance 26 but on the left hand side of the middle, in which position the generator saturates the reactor 14 to such an extent only that the current in the resistor 11 is just sufficient to generate enough heat to maintain the temperature of the furnace at the desired predetermined temperature.

In the event of a decrease in the temperature of the furnace such as might be caused by the introduction of a fresh cold furnace charge, the arm 27 is moved toward the left again by the temperature responsive device 30 so as to supply more current to the resistor and again raise the temperature of the furnace to the desired temperature. It will be understood that normally the contact arm will be in a position to the left of the middle of the resistance 26, as assumed, producing the generation of enough heat to supply the heat losses of the furnace and maintain the desired temperature.

For the purpose of preventing the temperature responsive control apparatus from building up a reversed generator voltage, and thereby increasing the rate of heat generation, in the event that the temperature of the furnace should be higher than the desired temperature, we provide an electric valve device 31 which is connected across the brushes 17 and 18 of the generator 16 and in a direction to prevent the flow of any substantial current through itself under the conditions previously assumed, in which the temperature of the furnace is below or equal to the desired temperature. In the event that the furnace temperature is above the desired temperature sufficiently for the contact arm 27 to be moved to the right hand side of the resistance 26, the excitation of the field coil 23 predominates and the field and voltage of the generator 16 is reversed. Without the electric valve 31 this voltage would saturate the reactor 14 to an extent depending upon its value and thereby increase the rate of heat generation by the resistor 11. With the electric valve 31, however, which may be a copper oxide rectifier connected across the brushes, the brushes are short-circuited with this reverse voltage and consequently no effective voltage will be applied to the coil 15. The current through the valve 31 will not be high enough to cause any damage to the generator for the reason that any such current causes a large secondary armature reaction flux which is not compensated for by the compensating field winding 22, through which no current flows. The shunt field winding 32, in the event one is used on the generator, also will have no voltage impressed across it and will have no effect. This shunt field winding when energized supplies a magnetic flux in the same direction as the primary magnetic flux produced by the current through the brushes 19 and 20.

Thus, in the event that the temperature of the furnace becomes higher than the desired temperature, no appreciable current is supplied to the resistor 11. Such a condition may result, for example, in the event that the furnace control is adjusted, as hereinafter described, to maintain a lower predetermined temperature when the furnace temperature at the time the adjustment is made is already higher than that lower temperature.

For the purpose of changing the sensitivity of the control, a variable resistance 33 is connected in the connections between the rectifier 25 and the field windings. A variation of this resistance changes the current and voltage supplied by the rectifier, whose voltage is constant, to the control circuit consisting of the resistance 26 and the windings 23 and 24. The result is that the amount of movement of the contact arm 27 required to produce a predetermined change in the current supplied to the windings 23 and 24 is changed, whereby the change in temperature required to produce this change in excitation is also changed. For example, if the amount of the resistance 33 connected in the circuit is increased, the voltage across the resistance 26 and the field windings is reduced, and as a result, a greater movement of the contact arm is required for a predetermined change in field excitation. This reduces the sensitivity of the control with the result that wider fluctuations in temperature will occur, such fluctuations in temperature being required to give the necessary change in the rate of heat generation to maintain the predetermined temperature.

The temperature responsive control device 30 may be any suitable device and, as shown, includes a thermocouple 34 which supplies a voltage varying with the temperature to an instrument 35 which indicates and records the temperature and also turns a shaft 36 connected through a worm gearing 37 to the contact arm 27. This apparatus 35 may be of the type described, for example, in the Hartigan Patent No. 1,991,248, issued February 12, 1935, for Furnace control apparatus.

A transformer 38 connected across the mains 12 and 13 supplies a suitable voltage to the rectifier 25, shown as a two-way copper oxide rectifier.

By means of the variable resistances 39 and 40 connected between the ends of the resistance 26 and the outside ends of the windings 23 and 24, the predetermined temperature to be maintained can be varied. By increasing one resistance and decreasing the other resistance, the temperature to be maintained can be changed as desired. For example, if the resistance 40 is increased and the resistance 39 decreased, it will be observed that for a given position of the arm 27 the excitation of the winding 23 is decreased and the winding 24 is increased. This increases the current supplied to the winding 15 and increases the current supplied to the resistor 11. Thus, the temperature of the furnace will increase to some higher value at which the rate of heat generation is reduced to a value just required to maintain that temperature. This higher temperature is thereafter maintained.

If desired, another field winding 41 can be added in series with the electric valve 31 for the purpose of increasing the effect of the reversed current through the electric valve. This field winding 41 is arranged to provide a magnetic excitation in a direction opposite to the excitation field windings 23 and 24.

While we have shown a particular embodiment of our invention, it will be understood, of course, that we do not wish to be limited thereto, since many modifications may be made and we, therefore, contemplate by the appended claims to cover any such modifications as fall within the true spirit and scope of our invention.

What we claim as new and desire to secure by Letters Patent of the United States is:

1. A control system for an electric load device comprising control means for varying a characteristic of said load device, a direct current generator connected to supply current to said control means, said generator being provided with a pair of current supply brushes connected to said control means and with a pair of short-circuited quadrature brushes, field excitation means for said generator, control means for said field excitation means responsive to said variable characteristic for varying the field of said generator in one direction from a predetermined value thereby to maintain said characteristic at a predetermined value and for reversing said field and the polarity of said generator in response to variation of said characteristic in the other direction from said predetermined value, and electric valve means connected across said generator for disabling said generator in the event of reversal of polarity of said generator.

2. A control system for an electric load device comprising control means for varying a characteristic of said load device, a direct current generator connected to supply current to said control means, said generator being provided with a pair of current supply brushes connected to said control means and with a pair of short-circuited quadrature brushes, field excitation means for said generator, control means for said field excitation means responsive to variations in said characteristic below a predetermined value for varying the field of said generator thereby to maintain said characteristic at said predetermined value and for reversing said field and the polarity of said generator in response to variation of said characteristic above said predetermined value, and electric valve means connected across said generator for disabling said generator in the event of reversal of polarity of said generator.

3. A control system for an electric load device comprising a saturable core reactor connected in series with said load device, a control winding for said reactor, a direct current generator connected to supply current to said control winding, said generator being provided with a pair of current supply brushes connected to said control winding and with a pair of short-circuited quadrature brushes, field excitation means for said generator, control means for said field excitation means responsive to said variable characteristic for varying the field of said generator in one direction from a predetermined value thereby to maintain said characteristic at a predetermined value and for reversing said field and the polarity of said generator in response to variation of said characteristic in the other direction from said predetermined value, and electric valve means connected across said generator for disabling said generator in the event of reversal of polarity of said generator.

4. A control system for an electric load device comprising control means for varying a characteristic of said load device, a direct current generator connected to supply current to said control means, said generator being provided with a pair of current supply brushes connected to said control means and with a pair of short-circuited quadrature brushes, a pair of exciting field windings for said generator connected for energization in opposition to each other, means responsive to said variable characteristic for controlling the relative excitation of said field windings to cause said generator to supply current to said control means so as to maintain said characteristic at a predetermined value, and electric valve means connected across said generator for disabling said generator in the event of reversal of the polarity of said generator.

MARTIN A. EDWARDS.
KENNETH K. BOWMAN.